Figure 1:
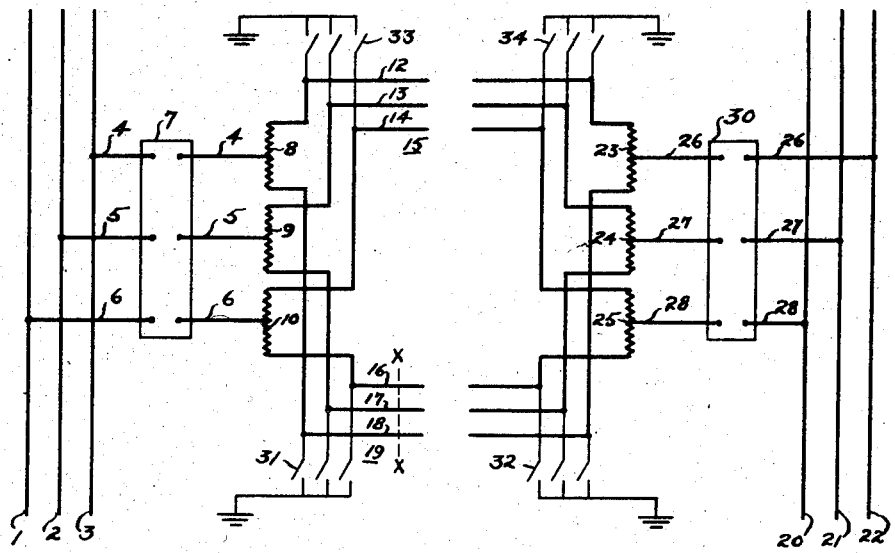

July 14, 1931.  F. W. GAY  1,814,684

POWER TRANSMISSION SYSTEM

Filed Oct. 12, 1928

INVENTOR.
FRAZER W. GAY
BY
ATTORNEY

Patented July 14, 1931

1,814,684

UNITED STATES PATENT OFFICE

FRAZER W. GAY, OF NEWARK, NEW JERSEY

POWER TRANSMISSION SYSTEM

Application filed October 12, 1928. Serial No. 312,085.

This invention relates, generally, to the transmission of electric power; and the invention has reference, more particularly, to a novel power transmission system that is so constructed and arranged as to inherently protect its transmission lines against destructive short circuit currents.

Heretofore, current limiting reactors have been employed to limit such short circuit currents. For efficient operation, the reactance of such reactors is ordinarily relatively low so as to produce a normal load voltage drop of not more than a few percent. In obtaining such efficiency however, the safety of the system suffers, for upon the occurrence of a short circuit the current in the short circuited line may rise to many times normal value. Such short circuit currents not only destroy insulation on the line, but also cause voltage disturbances which throw synchronous machines out of step and are generally the chief cause of unsatisfactory service on many systems.

A large percentage of the faults that develop on transmission lines are caused by lightning or switching surges or other disturbances which are of short duration. These disturbances generally cause no damage of themselves but the destructive power current that flows upon the occurrence of the fault frequently produces damage of a serious nature and requires the transmission line to be taken from service for a number of hours in order that repairs may be made.

The protection of a transmission system against such faults is a serious problem for the protective system must select the faulty line and disconnect the same before the damage at the point of fault has become disastrous and before the continuous operation of the system is jeopardized. Heretofore, it has been customary to obtain selectivity by varying the time setting of the relay.

It is an object of this invention to provide a novel power transmission system wherein the power currents, upon the occurrence of a short circuit, are prevented from flowing into such short circuit but are compelled to continue on the conductors through the point of short circuit to their destination. Hence, the power currents flowing in a short circuited transmission line of this invention are the same after a short circuit as before the occurrence of the same.

It is another object of this invention to provide suitable means for short circuiting and grounding transmission lines that develop faults.

In carrying out the invention, a pair of transmission lines are so connected through auto-transformers that one half of the power normally flows over each line. A failure on one of these lines immediately causes the entire power to flow over the remaining line at double voltage. The short circuiting and open circuiting of transmission lines under the present invention by means of switches is easily and cheaply accomplished since there are no excessive short circuit currents that must be switched. It is important to note that modern transmission lines are insulated to withstand lightning and switching surges and are therefore readily able to withstand double voltages for short periods of time during which repairs and changes are being made on the line out of service.

Other objects of this invention not at this time more particularly enumerated, will be clearly understood from the following detailed description of the same.

The invention is clearly illustrated in the accompanying drawings, in which:—

Figure 2:
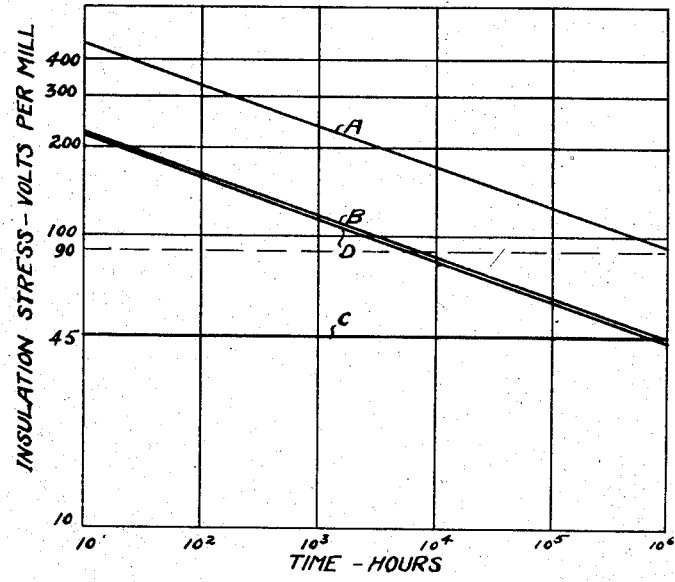

Fig. 1 is a wiring diagram illustrating the novel power transmission system of this invention; and Fig. 2 is a graphic representation showing the life of electric cables used in carrying out the invention.

Similar characters of reference are employed in all of the hereinabove described views to designate corresponding parts.

Referring now to Fig. 1 of the said drawings, the reference characters 1, 2 and 3 designate an electric power station bus that is adapted to supply electric energy through one or more of the novel transmission systems of this invention to a substation bus 20, 21 and 22. One such transmission system is shown connected to the bus 1, 2 and 3 by supply leads 4, 5 and 6. A circuit breaker 7 is included in the leads 4, 5 and 6. Leads 4, 5 and 6 are connected to the mid-tap of three single phase auto-transformers 8, 9 and 10. Three conductors 12, 13 and 14 of a transmission cable or line 15 are connected to corresponding ends of auto-transformers 8, 9 and 10. Three similar conductors 16, 17 and 18 of a transmission cable or line 19 are connected to the opposite ends of the transformers 8, 9 and 10.

Each of the conductors 12, 13, 14, 16, 17 and 18 carry one half of the energy supplied by the auto-transformer 8, 9 or 10 to which it is connected. This distribution of the load by the auto-transformers causes cable 15 to carry one half of the transmitted load and cable 19 the other half thereof. The cables 15 and 19 would ordinarily traverse different routes and may be of considerable length and the conductors of these cables are shown broken in Fig. 1 to indicate such length. Since the routes of these cables are ordinarily different, the possibility of simultaneous injury to both of them resulting in a short circuit of their conductors is exceedingly remote. The delivery ends of the cables 15 and 19 are brought into the desired substation and the conductors of these cables are connected to receiving auto-transformers 23, 24 and 25 that are similar to auto-transformers 8, 9 and 10. The mid-taps of auto-transformers 23, 24 and 25 are connected to terminal leads 26, 27 and 28 which are connected in turn to the substation bus 20, 21 and 22. A circuit breaker 30 is included in the circuit of leads 26, 27 and 28.

In operation, the power current flowing from power station bus 1, 2 and 3 over leads 4, 5 and 6 is equally divided in each phase at the mid-points of transformers 8, 9 and 10. One half the current in each phase passes in one direction through its corresponding transformer and the remainder passes through transformer in the opposite direction. This results in one half of the current of each phase flowing through conductors 12, 13 and 14 of cable 15 and the other half of such current flowing through conductors 16, 17 and 18 of cable 19. This divided phase current is again united at the substation by auto-transformers 23, 24 and 25 and then delivered to substation bus 20, 21 and 22. The voltage drop between circuit breaker 7 and circuit breaker 30 will be that due to the impedance of the auto-transformers which may be relatively low, together with that of the cables 15 and 19.

Should either of the cables 15 or 19 become short circuited at some point of its length between the power station and the substation, then the remaining cable will carry the total load. This may be shown by assuming, for example, that cable 19 is short circuit at X—X. Under such short circuit conditions, the halves of the windings of the auto-transformers 8, 9, 10, 23, 24 and 25 that are connected to conductors 16, 17 and 18 become star connected. These auto-transformers which up to this time were unexcited and had practically no magnetism in their cores now become excited to double voltage, causing the voltage in conductors 12, 13 and 14 to double, thereby causing cable 15 to carry the entire load that was previously carried by cables 15 and 19. It is evident that the currents will still divide at the mid points of the auto-transformers as before and will flow through conductors 16, 17 and 18. Substantially the only current that will flow from conductor to conductor at fault X—X will be the exciting current of the six auto-transformers. Thus, by pairing the power cables as described above disastrous short circuits which have heretofore occurred upon cable failure are avoided.

It will be evident that this system provides a means for instantly detecting a defective cable. This will be apparent to those skilled in the art since the voltmeters commonly installed in connection with power lines or cables such as 15 and 19 will indicate to the station operator that line 19, for example, is carrying no voltage, whereas line 15 is carrying twice normal voltage, thereby showing that a fault exists in line 19. It is apparent that false operation of relays on the system will not occur since substantially the only abnormal currents produced on the system by the fault are the exciting currents of the auto-transformers which on a large system are negligible.

Various means may be employed other than hand control for switching or cutting a cable out of service upon the occurrence of a fault therein. Upon the occurrence of the short circuit at X—X switches 31 and 32 are operated either automatically or by hand to short circuit and ground the defective cable 19. The faulty section as at X—X may then be replaced and switches 31 and 32 again operated to complete the power circuit through the cable 19 and resume normal operation thereof. In the event of a simultaneous fault on both cables 15 and 19 or a fault on a cable and a simultaneous transformer failure, the circuit breakers 7 and 30 may be opened to rupture the heavy short circuit current flowing. If cables and transformers are properly tested the possibility of such a simultaneous failure is remote. Switches 33 and 34 may be used to short circuit and ground cable 15 when a fault occurs in this cable.

If desired, the circuit breakers 7 and 30 may be opened upon the occurrence of a fault and thereby prevent more than a momentary operation of a cable at double voltage. Also, switches 31 and 32 may first be closed upon the occurrence of a failure in cable 19 and then immediately opened. Such operation will generally quench an arc over an insulation failure and allow normal service to be instantly resumed. If the fault persists after the above operation of switches 31 and 32 the circuit breakers 7 and 30 may be opened if desired.

It may be shown that the employment of the novel transmission system of this invention does not materially affect the life of transmission cables used, although such cables may be subjected to double normal voltages for temporary periods. In Fig. 2 of the drawings, the insulation stress in volts per mill of insulation thickness in a cable is plotted as ordinates and time in hours is plotted as obscissas. Curve A gives the life curve of the insulation on a modern three conductor high voltage cable at no load. It is well known that the life curve of such cables is a straight line when plotted to logarithmic scale against volts also plotted to logarithmic scale. Also, it is common knowledge that such cables after installation and under load will not withstand continuously a voltage much more than one half that shown by laboratory test. Curve B is plotted with ordinates of a magnitude equal to one half of those of curve A. In the past, the characteristics of cables have not been clearly understood and it has been impossible to use such cables to their full capacity owing to inefficient splice joints employed in installation of the cables. Such joints have commonly been filled with liquid compound such as ozite which gives the joints a breakdown endurance against surge voltages that is but little better than instantaneous. Modern splice joints, constructed of materials similar to those used in cable construction, are being installed having a volt-life curve approximating that of curve B.

Horizontal line C illustrates the insulation stress in a cable resulting from normal voltage on such cable. The intersection of line C with curve B gives the total life of a cable operating continuously under normal voltage condition. From Fig. 2 it will be seen that the life of such a cable is one million hours. After 100,000 hours or eleven and one-half years service, provided the cable has only been subjected to light load, its life should be reduced approximately one-tenth as an additional factor of safety owing to the age of the cable. Curve D shows the cable life after this theoretical reduction of one-tenth has been made. Curve B shows that the installed cable may be expected to have a life of 6,000 hours when subjected to double voltage when comparatively new and 5,400 hours when subjected to double voltage after a previous voltage life of 100,000 hours or eleven and one-half years. It is therefore evident that if the cable has been operated for a total time of, for example, 300 hours at double voltage during the eleven and one-half years of service, then its life has only been shortened approximately five percent of the normal life of such cable. It is considered that 300 hours should be a sufficient total time for removing defects except in cases of long cables.

It is to be understood that curve A is derived from laboratory tests and that actual installed performance as represented by curve B can only be maintained by careful testing and elimination of cable defects as by using direct current at high voltage. Such cable defects occur as the result of repeated expansion and contraction due to heating and cooling, especially when the cable is strained severely owing, for example, to overheating of an adjacent cable or to a heavy overload continued for several hours. Also loads maintained on cables extending through poorly cooled ducts and man holes are the principal cause of short cable life and the next most prolific cause of shortened cable life results from short circuit currents which may be ten to twenty times normal and may continue for many seconds.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A transmission system comprising, a polyphase station bus having a plurality of phase conductors, a pair of polyphase transmission lines, each having a plurality of phase conductors, a plurality of transformers corresponding in number to the number of phase conductors in said bus, each of said transformers having a continuous winding with a mid-tap connected to one of said bus phase conductors, the ends of each said winding being connected to a phase conductor of each of said transmission lines.

2. A transmission system comprising, a polyphase station bus having a plurality of phase conductors, a pair of polyphase transmission lines, each having a plurality of phase conductors, a plurality of transformers corresponding in number to the number of phase conductors in said bus, each of said transformers having a continuous winding with a mid-tap connected to one of said bus phase conductors, the ends of each said winding being connected to a phase conductor of each of said transmission lines, said thusly connected transmission line phase conductors being of the same phase as the bus conductor connected to the winding mid-tap.

3. A transmission system comprising, a polyphase sending bus and a polyphase receiving bus, said busses having a plurality of phase conductors, a pair of polyphase transmission lines, each having a plurality of phase conductors, a plurality of transformers, each of said transformers having a continuous winding with a mid-tap, certain of said transformer windings having their mid-taps connected to separate phase conductors of said sending bus and others of said transformer windings having their mid-taps connected to separate phase conductors of said receiving bus, the ends of said transformer windings being connected to separate phase conductors of said transmission lines so that the bus conductor and transmission line conductors connected to any one transformer winding are all of the same phase.

4. A transmission system comprising, a polyphase sending bus and a polyphase receiving bus, said busses having a plurality of phase conductors, a pair of polyphase transmission lines, each having a plurality of phase conductors, a plurality of transformers, each of said transformers having a continuous winding with a mid-tap, certain of said transformer windings having their mid-taps connected to separate phase conductors of said winding bus and others of said transformer windings having their mid-taps connected to separate phase conductors of said receiving bus, the heads of said transformer windings being connected to separate phase conductors of said transmission lines so that each pair of transmission line conductors in the same phase but in different lines are connected through a transformer winding at each end of the transmission lines to a bus conductor of the same phase as their own.

5. A transmission system comprising, a polyphase station bus having a plurality of phase conductors, a pair of polyphase transmission lines, each having a plurality of phase conductors, a plurality of transformers corresponding in number to the number of phase conductors in said bus, each of said transformers having a continuous winding with a mid-tap connected to one of said bus phase conductors, the ends of each said winding being connected to a phase conductor of each of said transmission lines, and means for grounding either one or the other of said transmission lines as desired.

6. In a transmission system, in combination, an electric power sending station, an electric power receiving station, two three phase transmission lines arranged to convey three phase power from said sending station to said receiving station, said sending station having an input bus and input transformers, each of said transformers having two connected winding sections interlinked by a common core, the connected ends of said winding sections being connected to a respective phase of said input bus, the other end of each of said connected winding sections being connected to the corresponding phase lead of a respective one of said transmission lines, said receiving station having an output bus and output transformers, each of said output transformers having two connected winding sections interlinked by a common core, the connected ends of said winding sections being connected to a respective phase of said output bus, the other end of each of said connected winding sections being connected to the corresponding phase lead of a respective one of said transmission lines, said winding section of said sending station and receiving station transformers operating to maintain the normal impedance path for power currents during a time of fault on one of said transmission lines.

In testimony, that I claim the invention set forth above I have hereunto set my hand this 10th day of October, 1928.

FRAZER W. GAY.